United States Patent
Skoog

(10) Patent No.: US 6,370,995 B1
(45) Date of Patent: Apr. 16, 2002

(54) HOLDER INCLUDING A HYDRAULIC PISTON FOR THE DETACHABLE ASSEMBLY OF CUTTING TOOLS

(75) Inventor: Anders Skoog, Sandviken (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/589,189

(22) Filed: Jun. 8, 2000

(30) Foreign Application Priority Data

Jun. 9, 1999 (SE) .............................................. 9902157

(51) Int. Cl.[7] .............................. B23C 5/26; B23B 31/10
(52) U.S. Cl. ............................ 82/160; 82/161; 82/164; 82/168; 279/4; 409/233
(58) Field of Search .......................... 82/160, 158, 161, 82/164, 165, 168; 279/4, 4.12, 2.09, 155, 74; 408/239 R; 409/233

(56) References Cited

U.S. PATENT DOCUMENTS 5,279,194 A * 1/1994 Armbrust ..................... 82/160
5,851,093 A * 12/1998 Erickson ..................... 409/234
5,876,041 A * 3/1999 Kuckelsberg et al. ...... 279/4.02
6,193,451 B1 * 2/2001 Asberg ........................ 409/233

* cited by examiner

*Primary Examiner*—Henry Tsai
(74) *Attorney, Agent, or Firm*—Burns, Doane, Swecker & Mathis, L.L.P.

(57) ABSTRACT

A holder for the detachable assembly of cutting tools includes a clamping mechanism, which has a piston axially movable by applying oil pressure on either of two opposite sides thereof. A projection of the piston includes a cone surface with a moderate cone angle arranged to co-operate with a wedge body which is self-locking in relation to the cone surface to keep the cutting tool clamped, even when oil pressure is relieved. In order to guarantee such self-locking, transverse grooves are provided in the cone surface enabling friction-reducing oil to be evacuated from the interface between the cone surface and an inner, partially cone-shaped surface on the wedge body.

6 Claims, 2 Drawing Sheets

HOLDER INCLUDING A HYDRAULIC PISTON FOR THE DETACHABLE ASSEMBLY OF CUTTING TOOLS

BACKGROUND OF THE INVENTION

This invention relates to a holder intended for the detachable assembly of cutting tools, which comprises a housing and a clamping mechanism arranged therein.

A conventional clamping mechanism includes a male element arranged for engagement in a female-like opening in the tool, the male element being movable backwards and forwards in relation to a bushing included in the housing. The male element moves between an inner end position in which the tool is clamped in relation to the housing, and an outer end position in which the tool is detachable from the housing. The male element is moved by means of a piston which is movable backwards and forwards in a cavity inside the housing and which separates outer and inner chambers to and from which hydraulic oil may be fed in order to move the male element up against either of said end positions. The piston includes a projection with an outer, rearwardly converging first cone surface for co-operation with a number of tangentially spaced wedge bodies, which have inner, concavely arched surfaces for abutment against said cone surface on the piston projection. The wedge bodies also include a convexly arched surface for abutment against an inner, rearwardly diverging cone surface in said bushing. The first cone surface on the piston projection has a moderate cone angle with the purpose of bringing about self-locking of the piston device in the front end position thereof.

Tool holders of the above-mentioned type are generally found in automatic machines for chip forming machining such as turning, milling, drilling and the like. An advantage of this type of holder is that it permits fast and simple tool changing. A problem difficult to master in practice in previously known tool holders has, however, been to guarantee a distinct self-locking of the wedge bodies when the piston is brought to the rear end position thereof for fixing the tool in the holder. This self-locking of the wedge bodies, which relies upon the cone surface of the piston projection having a small cone angle, is required in order to be able to relieve the oil pressure in the chambers while keeping the tool secured during the periods when the tool is in operation.

Through investigations, on which the present invention is based, it has been proved that one reason for the difficulties in obtain a distinct self-locking of the wedge bodies after the oil pressure on the piston has been relieved, is that a thin oil film is present between the cone surface of the piston projection and the individual inner, concavely ached surface of the wedge body as a consequence of the fact that the piston projection as well as the wedge bodies are housed in a chamber which is permanently filled with oil. This means that the friction between said surfaces is reduced so much by the oil film that the self-locking effect does not come into effect immediately. That is, the tensile force, which the piston projection exerts on the wedge bodies and said male element when the tool is clamped, is not maintained once the oil pressure is relieved.

OBJECTS AND SUMMARY OF THE INVENTION

The present invention aims at obviating the above-mentioned problems in previously known tool holders and at providing a tool holder which, in a reliable way, can bring about a distinct self-locking of the wedge bodies in connection with the clamping of a tool; all with the purpose of guaranteeing that the tensile force which is exerted by the piston device in connection with the clamping is maintained without interruption, even after the oil pressure has been relieved.

According to the invention, the above-mentioned object is attained by a holder for the detachable assembly of cutting tools. The holder comprises a housing, a bushing, and a clamping mechanism. The housing includes an inner cavity defining a longitudinal center axis. The housing includes front and rear axial ends, the front end being adapted to receive a cutting tool. The bushing is disposed in the cavity and includes a surface which is inclined obliquely relative to the axis. The clamping mechanism is arranged in the housing and includes a clamping element, a piston, and a plurality of wedge bodies. The clamping element is adapted to be received in a cutting tool and is movable axially forwardly and rearwardly relative to the bushing between an axially rearward clamping position for clamping a cutting tool, and an axially forward unclamping position for unclamping the cutting tool. The piston is movable forwardly and rearwardly within the cavity and has an axial projection. The piston is arranged to divide the cavity into forward and rearward chambers to and from which hydraulic oil can be fed for moving the piston and the clamping element forwardly and rearwardly between clamping and unclamping positions, respectively. The wedge bodies are arranged around the piston projection for locking the piston in the clamped position. Each wedge body has radially inner and outer surfaces each being inclined obliquely relative to the axis. The piston projection includes an outer surface which is inclined obliquely relative to the axis and is arranged to engage the inner surfaces of the wedge bodies when the piston is moved rearwardly, to displace the wedge bodies radially outwardly and produce engagement between the bushing surface and the outer surfaces of the wedge bodies. The bushing surface is arranged for displacing the wedge bodies axially rearwardly in response to the engagement between the bushing surface and the outer surfaces of the wedge bodies. The clamping element is arranged to be forwardly and rearwardly displaced in response to forward and rearward movement, respectively of the piston. The outer surface of the piston projection has at least one groove formed therein and extending generally circumferentially therearound for evacuating oil from an interface between the outer surface of the piston and the inner surfaces of the wedge bodies.

Preferably, the groove lies in a plane oriented perpendicularly to the axis. There is preferably a plurality of the grooves, the grooves being axially spaced apart.

DETAILED DESCRIPTION OF A PREFERRED EMBODIMENT OF THE INVENTION

A) Conventional Structure

Figure 1:
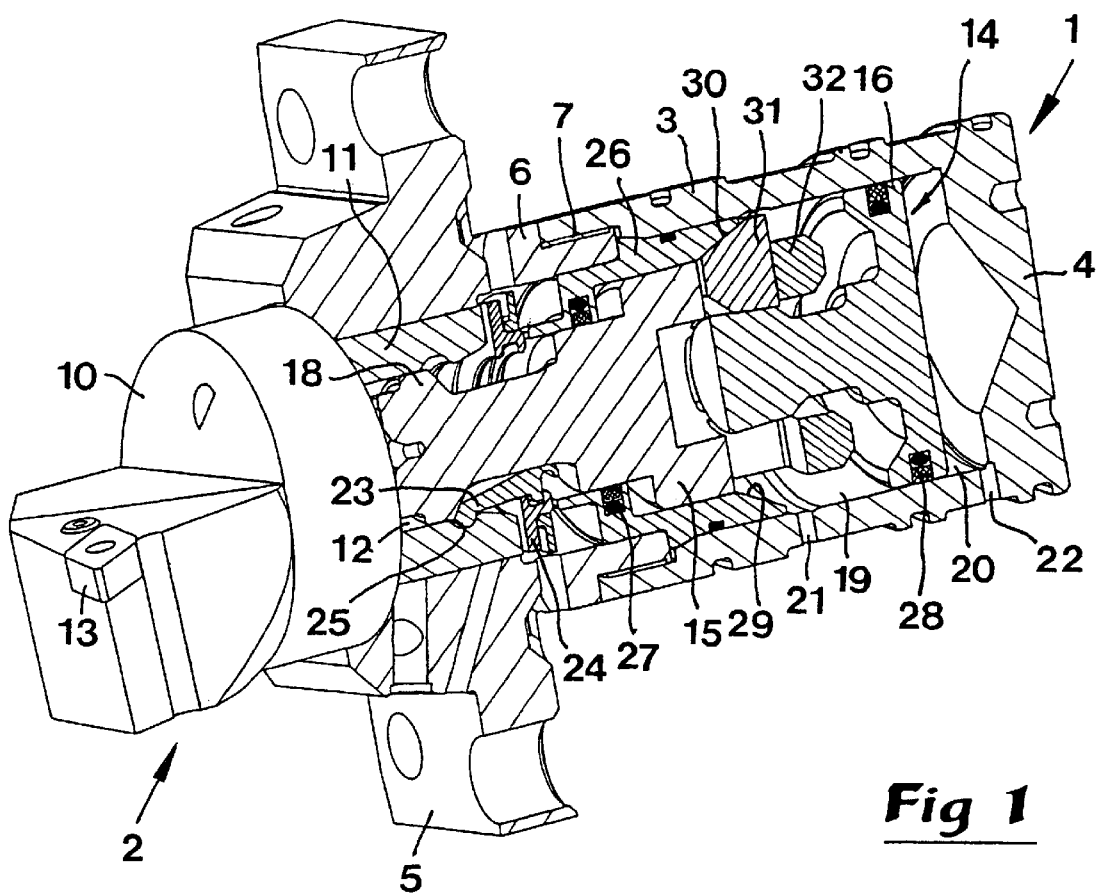
FIG. 1 is a perspective longitudinal section through a holder according to the invention, a cutting tool applied in the holder being shown partly in section.

In FIG. 1, numeral 1 generally designates a tool holder in which a tool 2 may be detachably mounted. The holder is in the shape of a cylindrical housing composed of rear and front parts. The rear part comprises a cylinder 3 and an end wall 4. The front part includes a flange 5 and a sleeve 6 extending backwards therefrom. The housing defines a longitudinal center axis A. The sleeve 6 is connected to the cylinder 3 via a threaded joint 7. In the flange 5, which may be fixed in the machine by means of screws 8 (see FIG. 3), a central hole 9 is formed, which serves as a grip for the tool 2.

The tool 2 comprises, in addition to a head 10, a part 11 in the form of a short tubular sleeve piece extending backwards from the head, which tube piece defines a female-like, rearwardly opening port 12. In practice, the outer envelope surface of the sleeve 11, as well as the inner surface of the hole 9, may be shaped as polygonal in cross section, and rearwardly tapering in axial section. Such tools are commercially available under the trademark COROMANT CAPTO™. As may be seen in FIG. 1, the tool 2 is equipped with at least one cutting insert 13.

Two components movable axially backwards and forwards are arranged inside the cavity of the housing 1, viz. a piston device 14 and a male clamping element designated 15. As may be seen in FIGS. 2 and 4, the piston device 14 includes a piston 16, as well as a projection 17 projecting forwards from one side thereof. The piston 16 divides the cavity into a front or outer chamber 19, and a rear or inner chamber 20. Oil may be fed into or out of these chambers 19, 20 via first and second channels 21 and 22, respectively.

The male clamping element 15, which has a symmetrical shape about its center axis, co-operates with a number of tangentially spaced spring fingers 23, which are mounted in a ring 24. The fingers 23 have thickened, outer portions which engage a groove 25 formed in the inside surface of the part 11. In the area of an intermediate section, the male element 15 is sealed by means of a sealing ring 27 against a bushing 26 arranged in the housing 1. Hydraulically, the outer chamber 19 is delimited by, on the one hand, said sealing ring 27 and, on the other hand, an analogous sealing ring 28 mounted on the periphery of the piston 16.

At the rear end thereof, the bushing 26 has an inner surface 29, preferably cone-shaped, which is inclined obliquely relative to the axis and which widens rearwards. Adapted to engage that surface 29 are partially cone-shaped, outer surfaces 30 formed on a number of tangentially spaced wedge bodies 31. Rear, planar end surfaces on these wedge bodies 31 abut against a ring 32 which is affixed to the male element 15. The number of wedge bodies may advantageously amount to four.

Figure 2:
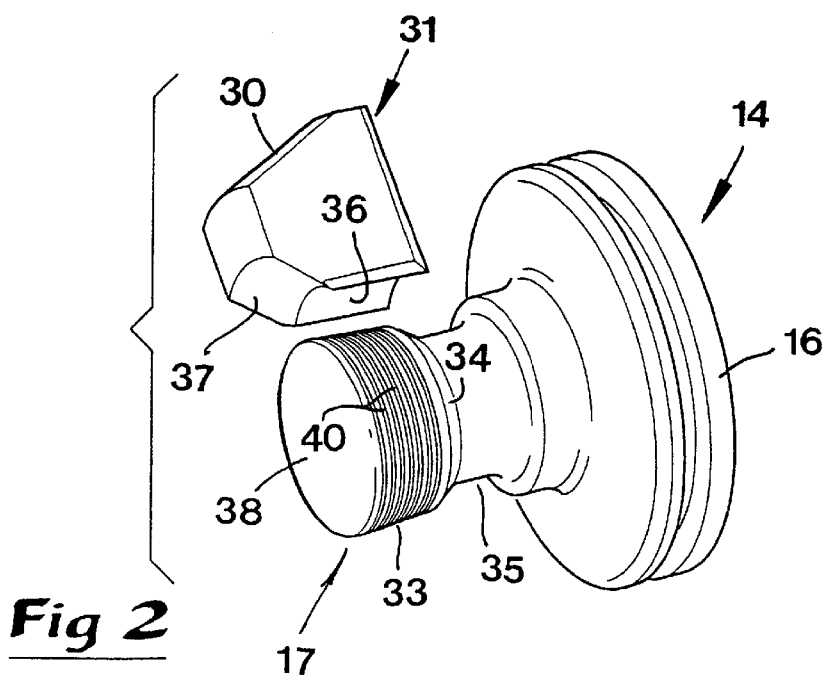
FIG. 2 is a perspective exploded view showing a piston device included in the tool holder, as well as an individual wedge body for co-operation with the piston device.
Figure 4:
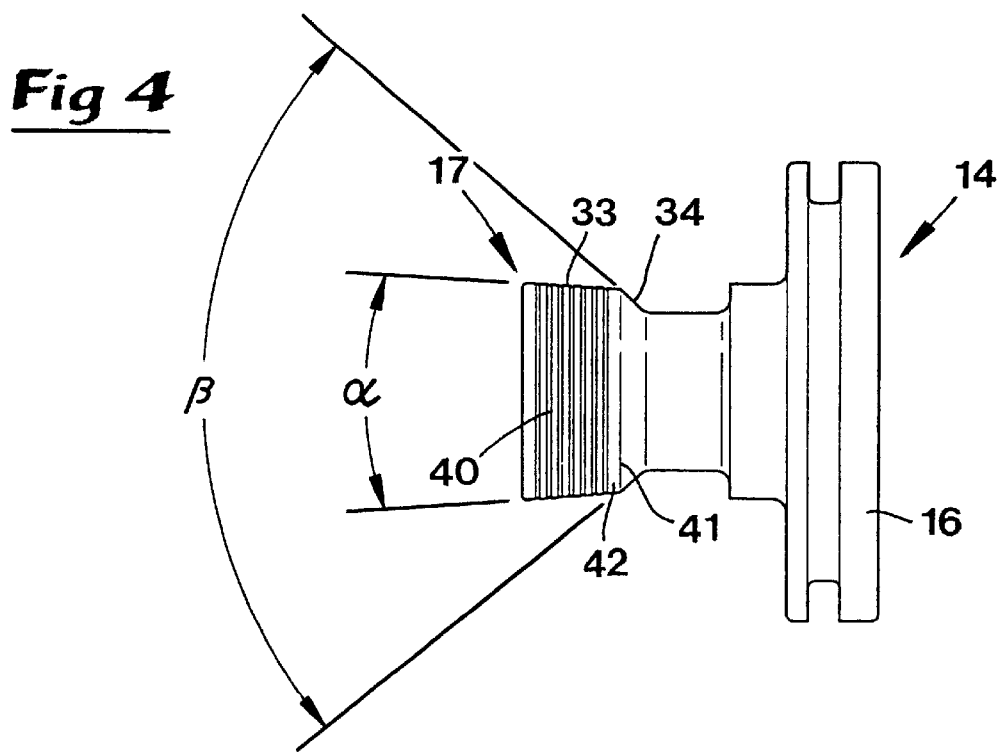
FIG. 4 is a side view of the piston device.

As way be seen in FIGS. 2 and 4, the piston projection 17 has outer surfaces 33, 34 inclined obliquely relative to the axis. Preferably, the surfaces 33, 34 are conical and define cone angles $\alpha$ and $\beta$, respectively. The cone angle $\alpha$ of the surface 33 is about 8°, while the cone angle $\beta$ of the surface 34 is larger and is about 90°. In practice, these angles may vary but the cone angle $\alpha$ of the surface 33 should, in all events, not exceed about 12° in order to attain the self-locking effect aimed at. There is a narrowed waist portion 35 between the cone surface 34 and the piston 16.

In FIG. 2 it can be seen how each individual wedge body 31 has an inner, obliquely inclined surface, preferably a concavely arched surface 36 intended for abutment against the first cone surface 33. At the front end thereof, this surface 36 transforms into a secondary, likewise concavely arched surface 37 intended to co-operate with the cone surface 34. In other respects, the wedge body is delimited by front and rear, plane surfaces, as well as a pair of opposite, plane side surfaces. The angle between imaginary generatrices drawn along the surfaces 36 and 30 correspond, in all essentials, to the angle between imaginary generatrices drawn along the cone surface 33 and the interior cone surface 29 at the rear end of the bushing 26.

The male element 15, the fingers 23, the wedge bodies 31 as well as the piston device 14 together form main components in a clamping mechanism by means of which the tool 2 may either be clamped or loosened from the housing 1. More precisely, clamping takes place in the state shown in the lower half of FIG. 3. In this state, the piston device 14 has, through the supply of hydraulic oil to the outer chamber 19, been displaced to an inner end position in which the cone surfaces 33, 34 have pulled the wedge bodies 31 to a radially outer end position. Initially, the radial outward motion of the wedge bodies 31 takes place rather fast, because the second cone surface 34, which abuts against the surface 37 on each wedge body, is comparatively steep (e.g., 45°). When the surface 37 on the wedge body (see FIG. 2) has passed the cone surface 34, and the surface 36 is abutted against the first cone surface 33, the radial motion becomes, however, moderate in relation to the radial motion of the piston device. The radially outwardly moving wedge bodies 31 are cammed rearwardly as they slide along the interior cone surface 29. The ring 32, and thereby the male element 15 that is fixed to the ring 32, are pushed axially rearwards at the same time as the wedge bodies 31 move axially rearwards. When the male element 15 approaches the rear end position thereof, the thickened, free end portions of the fingers 23 engage the groove 25 on the inside of the part 11 and are pressed in place in the groove by means of a thickened, partly cone-shaped end portion 18 on the male element. In this way, the, fingers 23 lock the tool 2 in relation to the holder.

When the tool is to be detached and pushed out of the holder, oil is fed into the chamber 20 via the channel 22, at the same time as oil from the chamber 19 may be returned to tank (reservoir) via the channel 21. In doing so, the male element 15 will be brought to a front end position, which is shown in the upper half of FIG. 3, more precisely by the fact, that the front, plane end surface 38 of the piston projection 17 is pressed against an analogous, rear end surface 39 on the male element. This end surface 39 constitutes the bottom of a cylindric recess in the rear end of the male element. In doing so, the ring 32 pushes the wedge bodies 31 in the axial forwards direction, the cone surfaces 29, 30 guaranteeing a displacement of the bodies also in the radial inward direction, more precisely in the direction towards a center axis of the tool holder. When the male element is brought to the front end position thereof, the fingers 23 spring radially inwards towards the center axis, the free ends of the fingers being detached from the engagement with the groove 25. This means that the locking of the tool in relation to the holder is terminated and that the tool is pushed out of the holder by a distance, and then the tool may be removed out of the holder by hand.

As far as the illustrated tool holder has been described hither-to, the same is, in all essentials, previously known. However, as has been initially pointed out, the desired frictional self-braking locking of the wedge bodies on the smooth cone surface 33 of the piston device 14 has not been attained. More precisely, the tensile force of the piston device has been lost as soon as the oil pressure in chamber 19 has been cut off.

B) Improvement

Characteristic of the present invention is that one or more transverse grooves 40 have been formed in the cone surface 33, for the purpose of evacuating existing oil from the interface between the surfaces 33, 36. It is advantageous if numerous grooves are arranged spaced-apart from each other in the axial direction, each individual groove being ring-shaped and extending in a plane perpendicularly to the geometrical center axis of the holder (which axis corresponds to the center axis of the piston projection 17). In FIG. 4, an embodiment is exemplified according to which the number of grooves 40 amounts to seven. These grooves cover the larger part of the length of the cone surface. However, it should be pointed out that the rear groove is situated at a certain distance from the transition line or the transition surface 41 between the two cone surfaces 33 and 34. In this way, it is guaranteed that the individual wedge body may climb from the cone surface 34 to the cone surface 33 without interfering with the grooves. Thus, the surface 36 may climb up on the cone surface 33 and move substantially axially along the surface portion designated 42 before the rear groove is reached. In this connection, it should be pointed out that the transition 41 between the cone surfaces 33, 34 in practice consists of a rounded surface portion rather than an abrupt interruption line.

When the individual wedge body, in connection with displacement of the piston device 14 in the rearwards direction, climbs up on the cone surface 33 and moves rearwards in relation to the same, the oil in the interface between the surfaces 33 and 36 will be pressed into the grooves and be evacuated laterally to free spaces, which are formed between each pair of tangentially spaced-apart wedge bodies. This means that essentially oil-free metallic surfaces come into contact with each other and achieve a radically increased friction between the surfaces. Therefore, when the oil pressure in chamber 19 is reduced to zero, a distinct wedging of the wedge bodies is maintained, and thereby a self-locking thereof. In this way, there is no risk that the tensile force of the piston device and thereby the clamping of the tool in the holder is lost.

Figure 3:
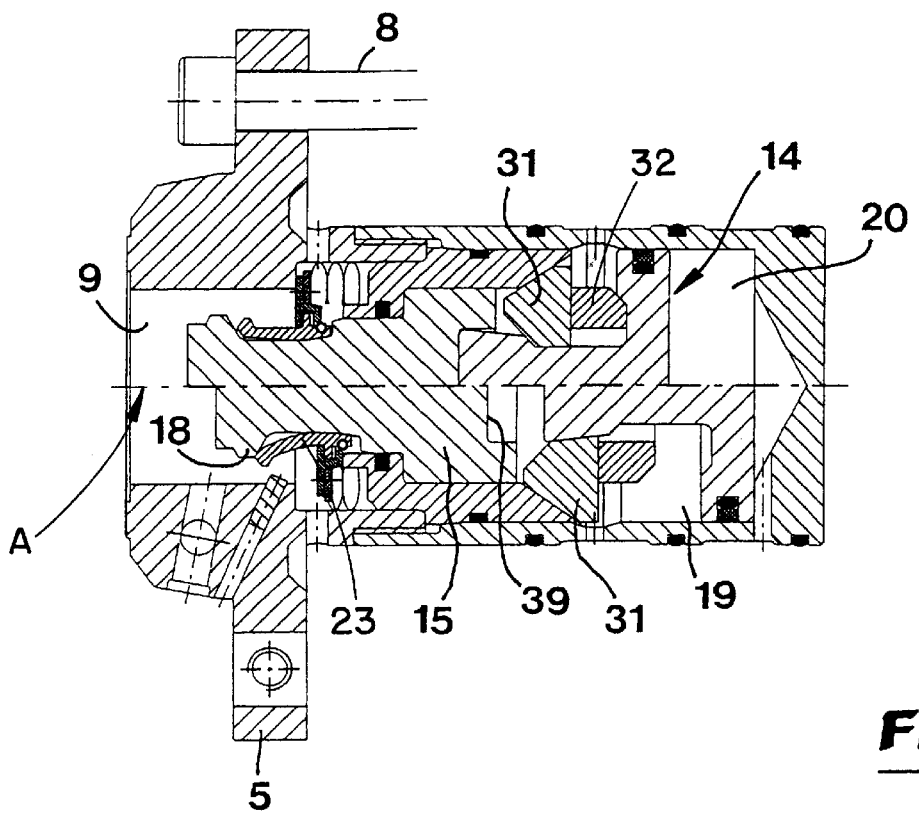
FIG. 3 is a longitudinal section through the tool holder according to FIG. 1, the upper half of the section illustrating a first functional state in which the tool is detachable from the holder, while the lower half illustrates a second functional state in which the tool is clamped in the holder.

It should be noted that the grooves 40 have not been shown in FIGS. 1 and 3 for reasons of scale.

In practice, the individual groove 40 may have a depth of 0.2–0.5 mm and a width within the range of 0.3–0.7 mm. However, these values are by no means critical and may vary upwards as well as downwards.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A holder for cutting tools, the holder comprising:
   a housing including an inner cavity defining a longitudinal center axis, the housing including front and rear axial ends, the front end adapted to received a cutting tool;
   a bushing disposed in the cavity and including a surface inclined obliquely relative to the axis; and
   a clamping mechanism arranged in the housing and including:
   a clamping element adapted to be received in a cutting tool and movable axially forwardly and rearwardly relative to the bushing between an axially rearward clamping position for clamping a cutting tool, and an axially forward unclamping position for unclamping the cutting tool,
   a piston movable forwardly and rearwardly within the cavity and having an axial projection, the piston arranged to divide the cavity into forward and rearward chambers to and from which hydraulic oil can be fed for moving the piston and the clamping element rearwardly and forwardly between clamping and unclamping positions, respectively, and
   a plurality of wedge bodies arranged around the piston projection for locking the piston in the clamping position, each wedge body having radially inner and outer surfaces each inclined obliquely relative to the axis,
   the piston projection including an outer surface inclined obliquely relative to the axis and arranged to engage the inner surfaces of the wedge bodies when the piston is moved rearwardly, to displace the wedge bodies radially outwardly and produce engagement between the bushing surface and the outer surfaces of the wedge bodies, the bushing surface arranged for displacing the wedge bodies axially rearwardly in response to the engagement between the bushing surface and the outer surfaces of the wedge bodies,
   the piston projection and the wedge bodies being in communication with the forward chamber, wherein pressurized oil fed to the forward chamber to move the piston and the clamping element to the clamping position tends to enter an interface between the outer surface of the piston and the inner surface of the wedge bodies;
   the clamping element arranged to be forwardly and rearwardly displaced in response to forward and rearward movement, respectively, of the piston,
   the outer surface of the piston projection having at least one groove formed therein and extending generally circumferentially therearound for evacuating oil from the interface between the outer surface of the piston and the inner surfaces of the wedge bodies to a location between adjacent wedge bodies.

2. The holder according to claim 1 wherein the at least one groove lies in a plane oriented perpendicularly to the axis.

3. The holder according to claim 2 wherein the groove extends around the at least one entire circumference of the outer surface of the piston projection.

4. The holder according to claim 1 wherein the at least one groove comprises a plurality of grooves, the grooves spaced apart along the axis.

5. The holder according to claim 4 wherein each of the grooves has a width of about 0.3–0.7 mm, and a depth of about 0.2–0.5 mm.

6. The holder according to claim 1 wherein the outer surface of the piston is conical and forms a cone angle having a value no greater than about 12°.

* * * * *